R. H. HARTE.
COUPLING LINK.
APPLICATION FILED JUNE 15, 1922.
1,433,133
Patented Oct. 24, 1922.
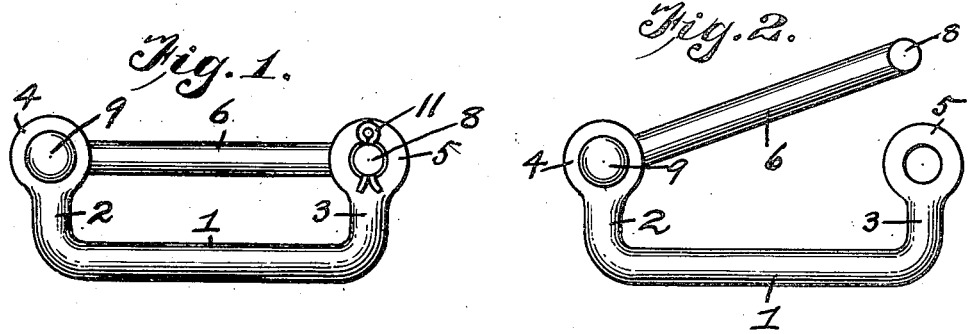
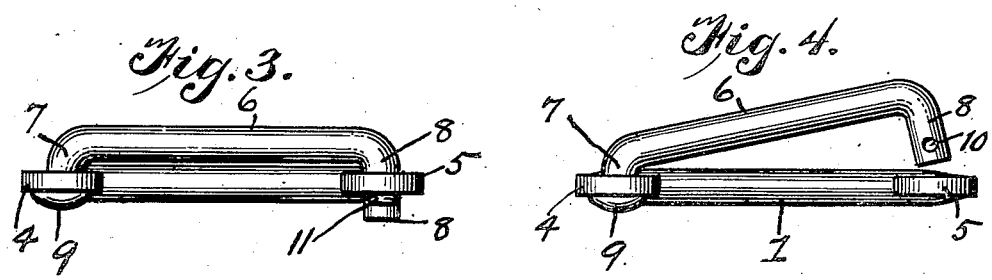
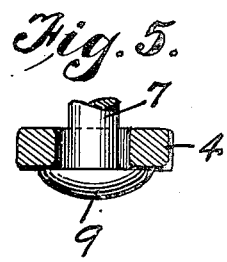
Inventor:
Roy H. Harte,
By
Attorney.

Patented Oct. 24, 1922.

1,433,133

UNITED STATES PATENT OFFICE.

ROY H. HARTE, OF QUINCY, ILLINOIS.

COUPLING LINK.

Application filed June 15, 1922. Serial No. 568,500.

*To all whom it may concern:*

Be it known that I, ROY H. HARTE, a citizen of the United States, residing at Quincy, in the county of Adams and State of Illinois, have invented new and useful Improvements in Coupling Links, of which the following is a specification.

This invention relates to links, contemplating certain improvements in links adapted for use in coupling two ends of a chain, as automobile anti-skid chains, for use as a clevis or readily connectible and disconnectible coupling between parts to be joined, and for other similar purposes.

The object of the invention is to provide a simple, reliable and efficient type of device of the character described which, in addition to being susceptible of manufacture and sale at a low price, is positive and reliable in its coupling action and may be easily and conveniently manipulated for coupling and uncoupling actions.

The invention consists of the features of construction, combination and arrangement of parts, hereinafter fully described and claimed, reference being had to the accompanying drawing, in which:—

Figure 1 is a side elevation of my improved coupling link, showing the closure member in closed and fastened position.

Figure 2 is a similar view, showing the free end of the closure member released and said member partially open.

Figure 3 is a plan view of the device as shown in Figure 1.

Figure 4 is a plan view of the device as shown in Figure 2.

Figure 5 is a sectional view showing the pivotal and sliding connection between the body member and short oblique arm of the closure member.

Referring to the drawing, 1 designates the body member of the coupling link, having at its ends arms 2 and 3 projecting at right angles to and from the same side of the body portion of said member, and terminating at their ends in flattened apertured portions or eyes 4 and 5, respectively. Provided for cooperation with said body member 1 is a closure member 6 having at its end arms 7 and 8, the arm 7 terminating in a head or enlargement 9 and the arm 8 having a transverse opening 10 for the reception of a cotter pin 11 or other similar fastener.

It will be observed that the arm 7 of the closure member 6 extends at an oblique angle to its body portion, while the arm 8 thereof extends substantially at right angles to said body portion. The arm 7 extends loosely through the openings of the eye 4 of the body member 1 and is held from displacement by its head or enlargement 9, thus terminally connecting said arm 7 with the eye 4. The sliding motion of the oblique arm 7, which is more or less arcuate in form, permits the opposite or free end of the closure member 6 carrying the arm 8 to swing in a direction at right angles to the eye 5 and toward or from the same, while said arm 7 is also adapted to have rotary motion in the eye 4 to permit the closure member 6 to swing to wide open and closed positions in a plane parallel with the plane of the member 1 and its eyes 4 and 5. By means of the swinging motion described, the arm 8 is adapted to be easily inserted through and withdrawn from engagement with the eye 5, while through the pivotal motion described the member 6 is adapted to be swung, in a plane at right angles to its aforesaid plane of swinging motion, to adapt the closure member to be opened to different degrees, as clearly illustrated in Figure 2. When the arm 8 is inserted through the eye 5 the cotter pin 11 may be passed through the opening 10 thereof to hold the closure member 6 in closed position, as will be readily understood.

As stated, the device may be used as a coupling link between end links of an anti-skid chain for automobile wheels, or as a general chain coupling or as a clevis or other similar element for uniting parts in a ready and convenient manner, and it will be apparent from the foregoing description that the invention provides a device for this purpose which, because of its simple form, and of the described movements of the closure member 6, adapts the link to be opened and closed in an easy and convenient manner under all conditions of service, and furthermore adapts the closure member 6 to be secured in closed position against liability of casual displacement. The construction described provides further for the removal of strain from the fastening member 11 inasmuch as the parts to which the coupling link is secured will bear against the arms 2 and 3 which will sustain all the strain, thus requiring only a simple retaining fastener to hold the member 6 against liability of disengagement. The simplicity of the construction also adapts the device to be manufactured and sold at a very low cost.

Having thus fully described my invention, I claim:—

1. A coupling link comprising a link member having right angularly extending arms provided with eyes, a closure member having an arm slidably and pivotally connected with one of said eyes and adapted for engagement with the other of said eyes, and means for holding said closure member in engagement with the latter-named eye.

2. A coupling link comprising a body member having right angularly extending arms provided with eyes, a closure member having at one end an arm extending at an oblique angle thereto and slidably and pivotally engaging one of said eyes and having a right angularly extending arm at its opposite end adapted to be engaged with the other of said eyes, and means for holding said right angularly extending arm of the coupling arm engaged with the second-named eye.

3. A coupling link comprising a body member having at its ends right angularly extending arms provided with eyes, a closure member having an obliquely disposed arm at one end and a right angularly disposed arm at its opposite end, said obliquely disposed arm being slidably and pivotally engaged with one of said eyes and provided with a retaining head, and the said right angularly extending arm adapted to be passed through the other of said eyes and provided with a transverse opening, and a fastening member engageable with said transverse opening to hold said right angularly extending arm of the closure member connected with the eye engaged thereby.

In testimony whereof I affix my signature.

ROY H. HARTE.